# United States Patent [19]

Verrips et al.

[11] 3,904,767

[45] Sept. 9, 1975

[54] PREPARING MARGARINE CONTAINING VIABLE BACTERIAL CELLS HAVING ALCOHOL-DEHYDROGENASE ACTIVITY

[75] Inventors: Cornelis Theodorus Verrips, Merellaan; Hendrik Vonkeman, Maassluis, both of Netherlands

[73] Assignee: Lever Brothers Company, New York, N.Y.

[22] Filed: Dec. 13, 1973

[21] Appl. No.: 424,494

[30] Foreign Application Priority Data

Dec. 15, 1972 Netherlands...................... 7257938

[52] U.S. Cl. ...................... 426/33; 426/42; 426/61; 195/112
[51] Int. Cl............................................... A23d 3/00
[58] Field of Search ........... 195/112; 426/33, 61, 42

[56] References Cited
UNITED STATES PATENTS
3,494,832   2/1970   Florent et al. ................... 195/112 X OTHER PUBLICATIONS
Fette Seifen Anstrichmittel, 72, No. 8, 1970, pp. 725–732.

Bills et al., "Dehydrogenase Activity of Lactic Streptococci," J. Dairy Science, Vol. 49, No. 12, 1966, pp. 1473–1477.

Jenness et al., Principles of Dairy Chemistry, 1959, John Wiley & Sons, Inc., New York, pp. 2, 3, 158, 159.

Schwitzer, Margarine and Other Food Fats, 1956, Interscience, Publishers, Inc., New York, pp. 236–240.

*Primary Examiner*—Joseph M. Golian
*Attorney, Agent, or Firm*—Arnold Grant; Melvin H. Kurtz; Kenneth F. Dusyn

[57]     ABSTRACT

The specification describes a process of preparing improved emulsions, particularly water-in-oil emulsions e.g. margarine, by emulsifying a fatty phase with an aqueous phase containing lactobacillaceae which have been grown in a common salt-containing nutrient medium. The emulsions obtained have an improved shelf-life since aldehydes formed during autoxidation of fats are converted into their corresponding alcohols.

4 Claims, No Drawings

PREPARING MARGARINE CONTAINING VIABLE BACTERIAL CELLS HAVING ALCOHOL-DEHYDROGENASE ACTIVITY

The present invention relates to a process for preparing improved emulsions by converting aldehydes which are present in such emulsions into their corresponding alcohols.

The invention is in particular of importance for the conversion of aldehydes formed during autoxidation of fats present in the aqueous fat emulsion.

The invention provides a process for preparation of emulsions by emulsifying a suitable fatty phase with a suitable aqueous phase, said aqueous phase containing lactobacillaceae which have been grown in a common salt-containing nutrient medium.

The aqueous fat emulsion of the invention preferably comprises substantial proportions of triglycerides of unsaturated fatty acids.

The term "fat" is used in this specification to include fatty acid triglycerides which are solid at 20°C and are commonly described as "fats," as well as triglycerides which are liquid at that temperature and are commonly described as "oils." The term "liquid oil," which is also used in this specification, refers to triglycerides which are liquid at 5°C. A "fatty phase" is a fat or fat blend which can include liquid oils and which is suitable as the sole fat in the emulsion of the invention. A "margarine fat" is a fat or fat blend which can contain liquid oils and which is suitable as the sole fat in margarine. The term "emulsion" includes both "fat-in-water" and "water-in-fat" emulsions, unless the emulsion type is specifically stated; the phrases "fat-in-water" and "water-in-fat" are used for emulsions containing either fats or liquid oils or mixtures of fats and liquid oils. Unless otherwise stated, the term "emulsion" includes "fat-in-water" and "water-in-fat" emulsions containing suitable amounts of fat-soluble emulsifiers, e.g. partial fatty acid glycerides, like monoglycerides, phosphatides, and fractions thereof, etc. and/or water-soluble emulsifiers, e.g. partial glycerides, phosphatides, egg yolk, etc.

The proportion of fatty phase in the emulsion of the invention can vary from 3–85%, the balance of the emulsion being an aqueous phase, adjusted to the required pH value. The aqueous phase can consist of water to which apart from suitable water-soluble emulsifiers various minor ingredients, e.g. salt, acid, proteins, flavours, etc. can be added.

In this specification all percentages, proportions and parts are by weight, the amount of fat in the emulsion is based on the weight of the emulsion, and the amount of fatty acids in the fat is based on the total amount of fatty acids in said fat, unless otherwise stated.

The keepability of an emulsion is influenced by several factors of which the formation of aldehydes by autoxidation of unsaturated fatty acid radicals is the most dominating. Various off-flavours have been detected in emulsions like butter and margarine, which were formed as a result of autoxidation of unsaturated, especially polyunsaturated fatty acid radicals. In "Netherlands Milk and Dairy Journal," Volume 24, I, pages 61–64 (1970), various alkanals, alkenals, alkadienals and alkatrienals are described which occur in Trainy (=Fishy) cold-stored butter. In the book "Symposium on Foods: Lipids and their Oxidation" the Avi-Publishing Company Inc., Westport, Connecticut, 1962, pages 216–229, G. Hoffmann describes saturated and unsaturated aldehyde off-flavours which by autoxidation were formed in vegetable oils, especially soyabean oil. According to Hoffmann at least 27 volatile aldehydes were isolated from soyabean oil.

Although by modern refining and hydrogenation techniques at least the majority of off-flavours including their precursors can be eliminated from or avoided in the fats to be used in the preparation of emulsions, the off-flavour formation as a result of autoxidation of processed emulsions under normal storage conditions could up to now not effectively be prevented, even if the best available antioxidants were used.

Preferably emulsions are prepared which contain in their fatty phase, high proportions of glycerides of polyunsaturated fatty acids, e.g. liquid oils containing at least 40% of polyunsaturated fatty acids, especially soyabean oil, sunflower oil, safflower oil and maize oil. In particular, emulsions are prepared containing at least 50%, preferably from 60–90%, of triglycerides containing at least 40% of polyunsaturated fatty acids, calculated on the total amount of fat in the emulsion. It is a great advantage of the invention that large quantities of these liquid oils, which are widely believed to be dietetically beneficial, can be incorporated in the emulsion of the invention without adversely affecting the keepability of the emulsions.

The invention can provide both water-in-fat and fat-in-water emulsions.

The invention is particularly of importance for emulsions which, owing to the nature of their preparation, transport conditions and storage, should have a relatively long shelf-life, e.g. margarines. In this specification by "margarines" are understood "water-in-fat" emulsions containing an aqueous phase of a pH value of about 4.5–7 and 75–85% of fat. The term "margarine" as used in this specification includes both emulsions which are plastic at ambient temperature and emulsions which are liquid or pourable at ambient temperature.

The aqueous fat emulsion of the invention, including margarine, preferably comprises lactose and/or citrate and/or milk solids and/or skim milk. These components are preferably present in the salt-containing aqueous phase of the emulsion prepared according to the invention.

The emulsions can be prepared in a manner known per se; during processing, those conditions which will detrimentally influence the survival of substantial proportions of lactobacillaceae should be avoided as much as possible. Preferably, during the preparation of the aqueous fat emulsion they should not be subjected to temperatures above 55°C for more than about 2 minutes or above 45°C for more than about 10 minutes. Particularly when the pH value of the emulsions should be below about 4.7, treatment of the emulsions at relatively high temperatures should be avoided as much as possible, since the combined effect of low pH and high temperature will adversely affect the survival of the bacteria. Too high concentrations of benzoic acid should be avoided.

In particular, emulsions are prepared containing less than 1, preferably less than 0.5, particularly less than 0.1 mg oxygen per litre, since it has surprisingly been observed that the number of viable bacteria in such emulsions is substantially higher than in emulsions containing more oxygen. A low oxygen content can be achieved by effecting the processing under substantially oxygen-free conditions e.g. by flushing the fat blend and the aqueous phase with nitrogen and by preparing the emulsion in substantially air-tight equipment.

The lactobacillaceae have preferably been grown in a salt-containing nutrient medium containing lactose and/or citrate and/or milk solids and/or skim milk. For an optimal growth of bacteria it is sometimes beneficial to add to milk or skim milk an additional proportion of citrate, e.g. its potassium or sodium salt.

Leuconostocs and streptococci are the most preferred lactobacillaceae for the purpose of the invention since they have the highest alcohol dehydrogenase activity. Suitable lactic acid starter cultures are e.g. those marketed by the Danish firms of Visby, under the trade name "Probat," and Hansen under the trade name "Syrevaekker" and "Streptococcus diacetilactus" or the "Marlac Culture" marketed by Marschall Dairy Laboratory Inc., USA.

In particular bacteria are used which have been grown several times, preferably at least three times, particularly five to 20 times, in the salt-containing nutrient medium. The salt-containing nutrient medium in which the bacteria are grown should contain a minor proportion of common salt, e.g. less than 10%, preferably 0.1–7% and particularly 1–5%. It has been established that, apart from sodium, the presence of potassium ions in the nutrient medium is essential. Generally, sufficient amount of potassium will be present in milk-based fat emulsions.

The bacteria are preferably grown at temperatures of 10°–40°C, particularly 15°–25°C. The emulsions and particularly the margarines of the invention are much more resistant to autoxidation of fats than the prior art products. This improved resistance follows from the number of viable bacteria per ml aqueous phase, which in the products of the invention is at least $10^5$ after 12 days' storage.

In fresh samples of commercially available margarines the number of viable bacteria were counted (1–6 days after production); the following data were obtained:

| | Brands | Salt Content | number of viable cells per ml aqueous phase |
|---|---|---|---|
| Belgium | Planta | 0.7 | $<10^2$ |
| | Planta plus | 0.3 | $<10^2$ |
| | Solo | 0.1 | $<10^2$ |
| | Becel | 0 | 210 |
| France | Astra | 0.45 | $<10^2$ |
| | Planta | 0.45 | $<10^2$ |
| | Trio No. 1 | 0 | $<10^2$ |
| | Trio No. 4 | 0 | 164 |
| Germany | Becel | 0.2 | $<10^2$ |
| | Flora | 0.2 | $<10^2$ |
| | Rama | 0.2 | $<10^2$ |
| Netherlands | Brio | 0 | $<10^2$ |
| | Blue Band | 0.76 | 200 |
| | Becel | 0 | $<10^2$ |
| United Kingdom | Stork | 2.0 | $<10^2$ |
| Austria | Rama | 0 | 150 |
| | Thea | 0.2 | $<10^2$ |
| Finland | Flora | 1.72 | 230 |
| | Milda | 1.72 | $<10^2$ |
| Denmark | Otto Mønstet | — | $<10^2$ |
| Switzerland | Dorina | 0.1 | $<10^2$ |
| | Planta | 0.1 | $<10^2$ |
| Russia | Liubiteljski | — | 212 |
| | Rossiiski | — | 62 |

The invention will now be illustrated by the following Examples.

EXAMPLE I

A salt-free pasteurized skim milk was inoculated at 20°C with 1% of a margarine lactic acid starter containing leuconostocs and streptococci, as marketed by the Danish firm Visby, under the name "Probat" (Experiment A). The skim milk was thus bacteriologically soured and at a pH value of 4.5 a sample of 1 ml was removed, which sample was brought into another batch of pasteurised skim milk of 20°C containing 2% of NaCl (Experiment B).

Subsequently a 1.0 ml sample was taken from the soured skim milk of Experiment B and brought again into a 2% common salt-containing pasteurised skim milk of 20°C. This procedure was repeated three times (Experiment C).

In Table I the pH reduction per unit of time of the soured milks of Experiments A, B and C is compiled.

By comparing the soured skim milk of Experiment C with those of Experiments A and B it can be concluded that bacteria become better adapted to a 2% common salt solution if they are grown therein several times. The soured skim milk obtained from Experiments A, B and C were tested on alcohol dehydrogenase activity. This was done by adding nonanal to the soured milks until the nonanal concentration was 20 ppm. After 20 minutes' incubation at 30°C, nonanal and its conversion products (nonanol and nonaneic acid) were isolated by extracting five times with ether in an ether/milk ratio of 1:1; the weight ratio of nonanal: nonanol was determined by GLC analysis. The number of bacteria in the soured milk was determined by plate counting. From the data obtained the number of molecules of nonanol formed per second per cel was calculated. The results are summarised in Table II, from which it can be concluded that the bacteria of Experiment C reduced nonanal 7 times as fast as the non-adapted bacteria of Experiment A. Owing to the presence of fewer autoxidation-aldehydes, fatty emulsions containing the aqueous phase of Experiment C were significantly preferred over identical emulsions containing the aqueous phase as prepared in Experiment A and/or B after storage of 7–10 weeks.

EXAMPLE II

Experiment C of Example I was repeated except that the third inoculation took place in pasteurized skim milk containing 4.0% NaCl. 1 ml of the soured skim milk with a pH value of 4.5, obtained after the third inoculation, was brought into a pasteurised skim milk containing 4.0% NaCl (Experiment D).

A comparative Experiment E was carried out similarly to Experiment A of Example I, except that now the starter was added to a 4.0% NaCl-containing pasteurized skim milk.

From Table III it follows that by inoculating three times, bacteria are developed which are resistant to a 4.0% NaCl solution. The bacteria of Experiment D were excellently suitable for converting aldehydes into alcohols in fatty emulsions. Margarines prepared from an aqueous phase containing the adapted bacteria were significantly preferred over margarines that were identical with the exception that they did not contain adapted bacteria. When the bacteria of Experiment D were re-inoculated for 10 times considerably reduced souring times were achieved.

EXAMPLE III

Experiment C of Example I was repeated except that the microorganisms were adapted five times instead of three to the 2% salt-containing medium. A pH value of below 5.0 was now reached already after 4 hours. The bacteria thus obtained were excellently suitable for converting aldehydes into alcohols in emulsions.

The soured skim milk obtained was used for the preparation of a margarine aqueous phase which consisted of:

50 ml soured skim milk
37 ml of a 25% NaCl solution
103 ml demineralised water
0.2 g citric acid
28 ml whey containing 30% solids.

For comparison an identical margarine aqueous phase was used except that it contained the soured skim milk of Experiment A. The survival of the lactic acid bacteria and the remaining alcohol dehydrogenase activity on storage at 15°C were tested as described in Example I.

The results are summarized in Table IV, from which it can be concluded that non-adapted bacteria die after several hours, whereas the adapted bacteria survive for about 4 weeks.

EXAMPLE IV

A margarine was prepared from 78 parts of a commercial margarine fat blend having the following fat composition: 87 parts of sunflower oil containing about 60% by weight of 9 cis, 12 cisoctadecadienoic acid and 13 parts of an interesterified blend of fully hydrogenated palm and palm kernel oil, and 22 parts of the aqueous phase of Example III. For comparison an identical margarine was made except that it contained the comparative aqueous phase of Example III. The margarines of the water-in-oil type were prepared by a process similar to that described in Andersen & William, Pergamon Press 2nd Ed. pp 246 et seq. Temperatures of over 45°C were avoided throughout. The survival of the lactic acid bacteria and the remaining alcohol dehydrogenase activity on storage of the margarine at 15°C were tested as follows: After storage 100 grams of margarine were mixed with 480 ml water containing 4% NaCl and heated to 40°C for 0.5 hr. The mixture was subsequently cooled to 5°C. From the separated aqueous phase a sample of 1 ml was taken for plate counting of the number of viable cells. The remaining separated aqueous phase was centrifuged and the bacteria thus separated were mixed with 20 ml of a freshly prepared sterile margarine aqueous phase. The aqueous phase thus obtained was treated and analysed as described in Example I, except that now incubation times of 60 minutes were used. The results, which not only show that the survival of the adapted bacteria is considerably improved but also that their alcoholdehydrogenase (ADH) activity per cell is considerably increased, are summarised in Table V.

EXAMPLE V

To illustrate the influence of the growth temperature of the bacteria on the one hand and the incubation temperature on the other hand the alcohol dehydrogenase activity of the skim milk of Experiment C was tested at various growth and incubation temperatures. The results are summarized in Table VI.

The soured skim milks illustrated in Table VI were suitable for preparing emulsions; those with the highest conversion rates of aldehyde to alcohol were preferred.

EXAMPLE VI

Example II was repeated except that the resulting product was again inoculated in pasteurised skim milk containing 6.0% of common salt. After 24 hours the required acidity for a margarine aqueous phase was obtained.

TABLE I

| Experiment | A pH | B pH | C pH |
|---|---|---|---|
| time (hours) 0 | 6.45 | 6.45 | 6.40 |
| after lag phase 1 | 6.15 | 6.40 | 6.10 |
| 2 | 5.62 | 6.30 | 5.80 |
| 3 | 5.12 | 6.15 | 5.65 |
| 4 | 4.80 | 5.90 | 5.40 |
| 5 | 4.65 | 5.65 | 5.15 |
| 6 | 4.50 | 5.45 | 4.90 |

TABLE II

| Experiment | Number of viable bacteria per ml | weight ratio nonanal:nonanol after 20 minutes | Molecules nonanol formed per cell per second |
|---|---|---|---|
| A | $22 \times 10^7$ | 28.4 : 71.6 | $5.1 \times 10^4$ |
| B | $22 \times 10^7$ | 36.0 : 64.0 | $4.5 \times 10^4$ |
| C | $40 \times 10^6$ | 4.0 : 96.0 | $3.7 \times 10^5$ |

TABLE III

| Experiment | D pH | E pH |
|---|---|---|
| time (hours) 0 | 6.50 | 6.50 |
| after lag phase 5 | 6.50 | 6.50 |
| 10 | 6.20 | 6.50 |
| 15 | 5.75 | 6.50 |
| 20 | 5.35 | 6.50 |
| 25 | 4.95 | 6.50 |

TABLE IV

| Example No. | Storage time hours | Number viable bacteria per ml | weight ratio nonanol:nonanol | molecular nonanol formed per cell per second |
|---|---|---|---|---|
| comparative | 0 | $45 \times 10^6$ | 96.2 : 3.8 | $2 \times 10^4$ |
|  | 144 | $57 \times 10^3$ | 100 : 0 | not detectable |
|  | 288 | $3 \times 10^2$ | 100 : 0 | ibid |
|  | 648 | <10 | 100 : 0 | ibid |
| III | 0 | $90 \times 10^5$ | 87.3 : 12.7 | $33.2 \times 10^4$ |
|  | 144 | $68 \times 10^5$ | *84.5 : 15.5 | $26.8 \times 10^4$ |
|  | 288 | $55 \times 10^5$ | *95 : 5 | $21.2 \times 10^4$ |
|  | 648 | $24 \times 10^4$ |  |  |